INVENTOR.
Giovanni Battista Martinenghi
BY
Agent

United States Patent Office 3,455,975
Patented July 15, 1969

3,455,975
REFINING PROCESS COMPRISING DEACIDIFICATION AND DEODORIZATION OF GLYCERIDE OILS AND FATS AND EQUIPMENT FOR SAID PROCESS
Giovanni Battista Martinenghi, Piazza XXV Aprile 3, Milan, Italy
Filed Oct. 14, 1964, Ser. No. 403,879
Int. Cl. C11c 1/10
U.S. Cl. 260—428                                    1 Claim

ABSTRACT OF THE DISCLOSURE

This invention relates to a process for the deacidification and the deodorization of glyceride oils and fats and also to apparatus for performing the process. The process involves passing low temperature steam through glyceride oils or fats maintained in conditions of high temperature and reduced pressure in order to entrain volatile materials. The steam is then removed from contact with the oil or fat and precipitated by refrigeration.

---

This invention relates to a refining process comprising deacidification and deodorization of glyceride oils and fats and to the equipment for carrying out said process.

It is well known that at present the deacidifying processes for oils and fats with simultaneous deodorization are carried out by stripping under vacuum free fats acids by means of direct steam the temperature of which is preferably between 150 and 200° C. (see G. B. Martinenghi "Tecnologia Chimica Industriale degli Oli, Grassi e Derivati" 3rd Edition U. Hoepli 1963, Milan, Italy as well as pamphlets and catalogs of the firms F.lli Gianazza, Legnano, Italy; SIAI Lerici, Cormano, Italy; Costruzioni Tecnico Olearie CTO, Via Cornalia 19, Milan, Italy.)

It is likewise known that to strip the last portions of free fatty acids (under approx. 3%) from the hot oil mass in a sufficiently short time to avoid over-heating and alterations of the glycerides, it is necessary to apply vacuums under 2 mm. Hg residual pressure and that it would be preferable to reach vacuums comprised between 0.1 and 0.8 mm. Hg which, when processing vegetal and animal oils having acidity up to 10–12%, would allow final acidities (expressed in terms of oleic acid) under 0.5% to be obtained within times of less than 30 minutes and temperatures under those normally used in the known processes. It is known, on the contrary, that in the apparatuses carrying out known refining processes vacuums, which are not under 1 mm. Hg are reached, said vacuums being generally obtained by steam operated booster ejectors arranged in series, with or without the aid of a vacuum pump, which, as being connected with the counter current barometric condenser, cannot get down to residual pressures under 25 mm. Hg of water at room temperature. Consequently, although with the booster ejectors vacuums of 0.5 mm. Hg may be obtained, such vacuum value is not conveniently feasible from an economic viewpoint in the apparatuses of known type, in view of the large steam supply needed.

It is the main object of this invention to provide a refining process for glyceride oils and fats utilizing high vacuums of the order of approximately 0.5 mm. Hg measurable in the still proper and requiring at the same time distilling temperatures under those normally adopted in the known processes, resorting consequently to means making the refining operations more economically convenient in a shorter time than in the known processes.

It is another object of this invention to provide a process which together with the refining and simultaneous deodorization of the oil or fat allows the preservation of the molecular structure of the oil or fat, as well as full recovery of distilled products.

A further object of this invention is that the vacuum required by said process be obtained by simplified, and hence more economic means, as compared to the known devices used in the known processes and normally comprising booster ejectors operating with steam at high pressure and temperature.

A further object of this invention is to provide a process in which the quality of the refined edible oils and fats obtained is not inferior to those obtained by known processes. These and other objects which will appear more clearly from the following description are achieved by a refining process for glyceride oils and fats, which comprises subjecting a glyceride oil or fat to a temperature in the range of 180° C. to 230° C. and a pressure in the range of 0.1 mm. Hg to 0.8 mm. Hg, stripping the glyceride oil or fat with steam having a pressure within said pressure range and a temperature below said temperature range and subsequently precipitating said steam by refrigeration.

It will thus be appreciated that this refining process for glyceride oils and fats comprises the step of stripping with steam the temperature of which substantially lies between 10° C. and 35° C. free fatty acids from a mass of glyceride oil or fat in a still under vacuum, the step of cooling at least once the distilled products to precipitate them, said cooling being provided before the vacuum producing means.

The temperature of the glyceride oil or fat within the still may be between 170 and 230° C.

The plant for refining glyceride oils and fats according to the invention comprises a steam source, a refining still, cooling equipments and a vacuum source and is characterized in that between the vacuum source and the still there are arranged the cooling equipments which connect the vacuum source to the still and from the still the vacuum is transmitted to the steam source. The steam source is an evaporation container (boiler) in which the water is at room temperature and the evaporation is due only to the vacuum which is in the range of 0.1 to 0.8 mm. Hg.

Further characteristics and advantages of the invention will become more apparent from the following detailed description of preferred non-limiting embodiments of the refining process according to this invention, illustrated in the following examples:

Example 1

1000 kg. of pressed olive oil with acidity of 5.0% (so-called "shining" oil) expressed in terms of oleic acid, after decolorization treatment with active earth (artificially activated montmorillonite earth) and activated carbon and relevant filtration were introduced in the stainless equipment for the deacidification-deodorization by distillation in steam current under vacuum of the type described below with reference to the drawing. The conditions under which the equipment was operated at fixed charges (batchwise) were the following: vacuum of 0.1–0.6 mm. Hg of residual pressure, preferably 0.4 obtained by means of the only vacuum pump without the use of steam operated booster ejectors, with intervention of suitable temperature to precipitate steam in the form of ice, without allowing it consequently to reach the pump itself. The effective temperature of distillation-deodorization was between 180 and 225° C., preferably 195°–210° C., measured within the oil itself under treatment.

The duration of the actual treatment at the aforesaid temperature was 10 to 45 minutes, preferably 20 minutes. The duration of the vacuum needed, also during charging and discharging operation, heating of the oil (cooling in other container) was between 60 and 120 minutes. The weight of direct "cold" steam necessary for the entire operation was 15 to 60 kg. (1.5 to 4.0% in weight as compared to the oil), preferably 20 to 40 kg. Final cooling temperature of the last distillates, beyond the collection container of the fatty acids, was between −40 and −15° C., preferably −20/−30° C. Under these working conditions approx. 220 kg. of distilled fatty acids were obtained in a yellowish white color with acidity of 91% (expressed in terms of oleic acid) and 3780 kg. (approx.) of perfectly deodorized oil of a light yellow color having a characteristic pleasant bland taste with 0.25% acidity.

Example 2

4000 kg. of maize germ oil, raw, orange colored, with acidity of 7%, expressed in terms of oleic acid, prerefined until reaching a yellow color, were treated under the same refining conditions as specified in Example 1 with the only exception that the effective distilling temperature was preferably between 200 and 220° C. Approx. 336 kg. of distilled fatty acids in yellowish white color were obtained, containing approx. 15% of unsaponifiable portion and about 3664 kg. of oil of gold yellow color with typical pleasant odor and taste and acidity of 0.30%.

By comparing Examples 1 and 2 with the data from a similar operation carried out in the presently current known physical distillation refining apparatuses in which the vacuum is obtained by means of two large steam operated booster ejectors (such as those manufactured by Girdler Corp. of U.S.A.) an average consumption of 1200 kg./hour steam ejected by the booster ejectors was ascertained to reach a vacuum value of almost 1 mm. Hg residual pressure. Under such conditions the deacidification operation may be carried out under regulatory 0.5% acidity only by injecting through the oil in a fine subdivision the steam supplied by the boiler at high temperature (above 180° C.) which is in quantity (approx. 50 kg.) a little higher than that specified in the preceding examples: since it should reach the temperature of approx. 180° C. it requires finally a considerable quantity of water in the barometric condenser to precipitate the steam and with the loss by entrainment of a certain quantity of distilled fatty acids which discharge in the traps and sewage.

Referring now to the actual indicative prices in Italian currency given only for comparative purposes, i.e. £. 10 per kwh. and £. 14 per kg. fuel oil the following comparison may be established regarding the distilling operation conducted according to the two systems (the other items being equal and in the first place with a daily output of 240 quintals of refined product).

(a) By the process according to this invention a maximum of refrigeration units corresponding to 10 kwh. is required and taking into account the 20 kwh. of the vacuum pump we have a total of 30 kwh. which at £. 10 per kwh. give an expense of £. 300.

(b) With the known process (utilizing booster ejectors for the vacuum) the average consumption of steam is 1.200 kg./hour without taking into account approx. 50 kg. of direct steam at 180° C. at least, used for stripping; to such quantity of steam correspond 120 kg. of fuel oil/hour at £. 14/kg. with a total of £. 1680. The considerable loss of the acids entrained by the booster ejectors and barometric condenser up to the sewage has not been taken into account. The cost difference between the one and the other refining system is quite apparent, so that it is not necessary to point out other secondary factors making such difference more considerable.

In the following description a type of equipment will be described adapted for carrying out the process according to this invention illustrated by way of example in the accompanying drawing, in which.

Figure 1:
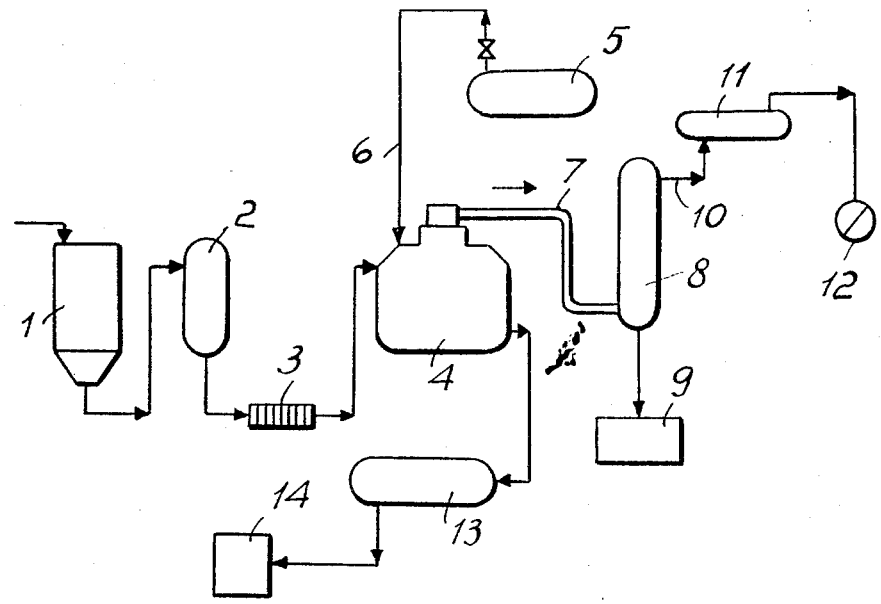
FIG. 1 represents a type of equipment for the discontinuous (batch) execution of the process according to this invention.

Referring now to said figures, the oil or the fat undergoes if necessary an acid pre-treatment in the container 1 and subsequently the deodorization by adsorption with activated earths or carbon in the container 2. After passing through the filter 3, the oil reaches the still 4 for deacidification-deodorization (FIG. 1) which operates batchwise. The still 5 is of the retort type currently used as deodorizer in oil industries (such as those constructed by Wuster & Sanger), but provided according to the invention with an indirect steam coil for heating purposes and a perforated coil for bubbling therethrough the direct "cold" steam coming from the water container (evaporator or "cold" boiler) at room temperature. From the boiler 5 containing preventively degassed distilled water, the steam produced therein under high vacuum with values comprised between 0.1 and 0.6 mm. Hg of residual pressure and hence at low temperature reaches said still 4 by means of the duct 6. The thus produced steam has a very high speed due to the strong depression, so that said steam determines in the oil mass contained in the still 4 on a considerable agitation with consequent increase of the surface of the oil exposed to the steam stripping action. When the cold steam at low pressure enters into contact with the hot oil an abrupt (explosive) expansion of the steam takes place which increases the agitation of the oil and enhances the stripping action. It will be appreciated that the outlet openings in the "cold" steam coil through which the direct steam enters the still are submerged by the bubbling hot oil under agitation so that the usual hydrostatic principles are not appliable under such circumstances but hydrodynamic and thermodynamic principles should be also taken into account. In this way the oil head above the steam outlet openings may be in the range of 100 to 250 mm. It will be further appreciated that in the known processes the steam which is injected in the oil of the still has a temperature not lower than 180° and has an over-pressure greater than 2 atm. The steam according to the invention on the contrary is cold (10–35° C.) and has no over-pressure, but the pressure as created by the vacuum (0.2–0.8 mm. Hg). The thus stripped fatty acids and the steam go out via the duct 7 reaching the condenser 8 of common type with a stainless container cooled spontaneously by the room temperature, whence the condensed parts collect in 9 whilst the more volatile parts of the oil and the steam outgoing from said condenser 8 via the duct 10 are precipitated in the refrigerator or trap or low temperature condenser 11 whence they are discharged when a certain accumulation has been reached; by means of at least one peripheral cooling circuit said refrigerator 11 is kept at a temperature between 40° C. and 20° C. under zero varying in this range with the variation of the residual pressure between 0.1 and 0.8 mm. Hg, said vacuums being obtainable by means of the rotary pump 12 which thanks to said refrigerator 11 is not contaminated by the products of distillation.

It has been experimentally found that the quantity of neutral glyceride entrained together with the free acidity lies between 10 and 20% by weight with respect to the free acidity itself, which represents a great saving as compared to the deacidification according to known processes.

The refined oil, once the refining period has terminated, leaves the still 4 and by cooling down in 13 is collected in the container 14.

Figure 2:
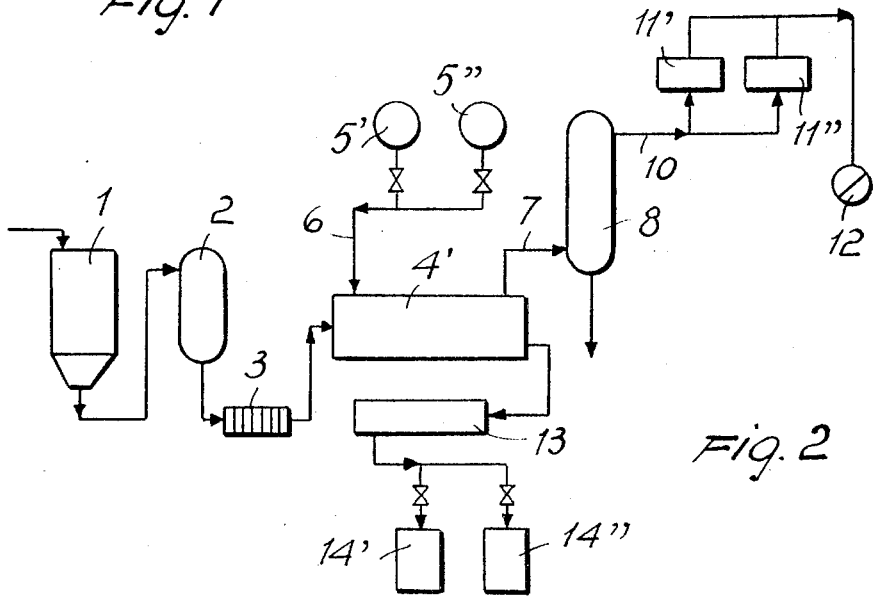
FIG. 2 represents a type of equipment for the continuous execution of the process according to this invention.

In FIG. 2 the continuous process is shown as a modified embodiment of the invention. According to this scheme, the still 4′ is constructed according to one of the current designs of continuous stills of the described type in which arrangements have been made for vapors of fatty acids to develop in the first section of their passage through the continuous still 4′ and to the carried away prior to entering into contact with oil flowing in the subsequent sections of the still itself, and in this manner the outgoing oil is prevented from retaining disagreeable residual odors which are progressively eliminated by the cooperation of the vacuum, the steam and the heat. Both in the present continuous process and in the process formerly described, the fatty acids in the still 4' or 4 are kept at a temperature of approx. 190–220° C. by heating e.g. by means of small-sized boilers (not shown in the figures) and closed circuit coil, with steam, Dowtherm mixture and the like. In this continuous process the production of steam at low temperature takes place in the boilers 5' and 5" which alternatively operate as well as in the containers 14' and 14" for collection of the refined product and in refrigerators 11' and 11" for precipitating more volatile components and steam. The alternating operation of the mentioned equipment is necessary to maintain the continuity of the process. Thus, when there are points in the plant or equipment which would impair for different reasons the continuity of operation (e.g. the continuous supply of water in the "cold" boiler would disturb the equilibrium of pressure in the plant for such a high vacuum; the continuous removal of the ice (steam at −25° C.) from the trap would cause the air to enter in the equipment) it is necessary to solve the problem with two twin containers which are alternatingly put in operation and discharged.

The vacuum created only by the rotary pump is much more economic than that of the known processes utilizing booster ejectors with high pressure and temperature steam injection.

The invention as devised is subject to several changes and modifications all falling within the scope of the inventive conception, furthermore, all details may be replaced with other technically equivalent particulars. Any materials and dimensions could be practically adopted and any number of the apparatuses could be used depending upon requirements.

I claim:

1. A process for simultaneous deacidification and deodorization of glyceride oils and fats which comprises subjecting a glyceride oil or fat to a temperature in the range of 180° C. to 230° C. and a pressure in the range of 0.1 mm. Hg to 0.8 mm. Hg, stripping the glyceride oil or fat with steam having a pressure within said pressure range and temperature within the range of 10° C. to 35° C., and subsequently precipitating said steam by refrigeration at temperatures between −40° C. and −20° C. at pressures between 0.1 mm. Hg and 0.8 mm. Hg respectively, to precipitate the steam in form of ice.

References Cited

UNITED STATES PATENTS 2,674,609  4/1954  Beal et al. _____ 260—428
2,919,232  12/1959  Stingley _____ 260—428

ALEX MAZEL, Primary Examiner

A. M. TIGHE, Assistant Examiner